(12) United States Patent
Takeo et al.

(10) Patent No.: US 7,311,447 B2
(45) Date of Patent: Dec. 25, 2007

(54) ROLLER BEARING

(75) Inventors: Noriyuki Takeo, Kanagawa (JP);
Satoshi Kadokawa, Kanagawa (JP);
Akira Takahashi, Kanagawa (JP)

(73) Assignee: NSK Ltd., Tokyo (JP)

( * ) Notice: Subject to any disclaimer, the term of this patent is extended or adjusted under 35 U.S.C. 154(b) by 119 days.

(21) Appl. No.: 10/929,438

(22) Filed: Aug. 31, 2004

(65) Prior Publication Data

US 2005/0084192 A1    Apr. 21, 2005

(30) Foreign Application Priority Data

Sep. 19, 2003   (JP)   ............... P.2003-327914
Nov. 27, 2003   (JP)   ............... P.2003-397274
Dec. 5, 2003    (JP)   ............... P.2003-407487

(51) Int. Cl.
*F16C 9/02*      (2006.01)
(52) U.S. Cl. ........................ 384/457; 384/906
(58) Field of Classification Search ............. 384/457, 384/499, 501–506, 570, 559, 560, 564, 569, 384/577, 584, 585, 280, 281, 294; 74/594.1; 123/195 R
See application file for complete search history.

(56) References Cited

U.S. PATENT DOCUMENTS

| | | | | |
|---|---|---|---|---|
| 926,966 A * | 7/1909 | Shirley | ........................ | 384/569 |
| 955,120 A * | 4/1910 | Lockwood | .................. | 384/570 |
| 1,821,873 A * | 9/1931 | Best | ........................... | 384/457 |
| 1,921,488 A * | 8/1933 | Smith | ......................... | 384/570 |
| 2,170,545 A * | 8/1939 | Burton | ....................... | 384/281 |
| 2,528,987 A * | 11/1950 | Albett | ......................... | 384/570 |
| 2,682,435 A * | 6/1954 | Rien et al. | .................. | 384/562 |
| 3,163,477 A * | 12/1964 | Schmidt | ..................... | 384/577 |
| 3,244,463 A * | 4/1966 | Bowen et al. | ............. | 384/127 |
| 4,231,623 A * | 11/1980 | Kaufman | .................... | 384/429 |
| 5,028,153 A * | 7/1991 | Suica et al. | ................ | 384/585 |
| 5,172,986 A * | 12/1992 | Yokota | ....................... | 384/580 |

FOREIGN PATENT DOCUMENTS

| | | |
|---|---|---|
| JP | 8-128306 A | 5/1996 |
| JP | 2001-12214 A | 1/2001 |

OTHER PUBLICATIONS

"Automotive Camshaft Support Needle Roller Bearings", a Catalog of The Torrington Company, 1998.

* cited by examiner

*Primary Examiner*—Thomas R. Hannon
(74) *Attorney, Agent, or Firm*—Sughrue Mion, PLLC

(57) ABSTRACT

A roller bearing for rotatably supporting a rotating shaft of an internal combustion engine between a main body and a cap of the internal combustion engine. The roller bearing including: a plurality of rollers; a retainer which is cirumferentially splittable and supports the plurality of rollers; and an outer race which is cirumferentially splittable and forms a raceway surface for the plurality of rollers. The retainer is split into a plurality of retaining members. The outer race is split into a plurality of race plates. At least one of the race plates is provided with one of a projection and a cavity to be engaged with one of the main body and the cap to restrict a relative movement between the one of the race plates and the one of the cylinder head and the cap.

9 Claims, 11 Drawing Sheets

ROLLER BEARING

BACKGROUND OF THE INVENTION

1. Field of the Invention

The present invention relates to a roller bearing used in an internal combustion engine and an internal combustion engine using the same.

2. Background Art

In an internal combustion engine, for example, in a case where a camshaft is rotatably supported in a cylinder head, sliding bearings are generally used. In recent years, however, the actual situation is such that attention has been focused on less fuel-consuming internal combustion engines from the viewpoints of such as effective utilization of resources and reduction of carbon dioxides. Accordingly, attempts have been made to further reduce the power loss in internal combustion engines by changing sliding bearings to rolling bearings whose drag resistance is generally smaller (refer to JP-A-8-128306). In particular, in the so-called DOHC-type internal combustion engines and V-type internal combustion engines, the number of camshafts becomes relatively numerous in the light of their structures, so that it is expected that the change of the rolling bearings leads to some degree of improvement in fuel consumption.

Incidentally, a pair of cam lobes are generally formed in each cylinder, and journal portions which are supported by rolling bearings are disposed between the cam lobes or between the cam lobe and a large-diameter end portion. Therefore, there is a problem in that ordinary rolling bearings cannot be fitted on the journal portions by passing the cam lobes and the like which project more radially outward. Accordingly, it has been conceived to circumferentially split retainers of rolling bearings and to build these split retainers onto the journal portions from the radially outer side without passing the cam lobes and the like, in the same way as conventionally used sliding bearings (refer to JP-A-2001-12214).

SUMMARY OF THE INVENTION

However, it is desirable to build races on the cylinder head and the cap so as to secure raceway surfaces for the rollers to roll. For this reason, it is considered necessary to circumferentially split the races and incorporate them in the same way as the retainers. Nevertheless, since the races themselves are generally thin cylinders, if they are split circumferentially and are merely built on the cylinder head and the cap, there is a possibility of the races rotating in circular holes formed by the cylinder head and the cap and coming off in an axial direction. A similar problem occurs in a case where a crankshaft is supported between a cylinder block and a bearing cap.

In the case where the races and retainers are thus built in by being split, problems, such as the securing of roundness, are expected to occur which are essentially different from those of the case where cylindrical races are built in.

The present invention has been devised in view of the above-described problems, and its object is to provide a roller bearing which is capable of appropriately supporting a camshaft or a crankshaft with lower friction, as well as an internal combustion engine using the same.

The invention provides a roller bearing for rotatably supporting a rotating shaft of an internal combustion engine between a main body and a cap of the internal combustion engine, the roller bearing includes: a plurality of rollers; a retainer which is cirumferentially splittable and supports the plurality of rollers; and an outer race which is cirumferentially splittable and forms a raceway surface for the plurality of rollers; wherein the retainer is split into a plurality of retaining members; the outer race is split into a plurality of race plates; and at least one of the race plates is provided with one of a projection and a cavity to be engaged with one of the main body and the cap to restrict a relative movement between the one of the race plates and the one of the cylinder head and the cap.

The invention provides a roller bearing for rotatably supporting a rotating shaft of an internal combustion engine between a main body and a cap of the internal combustion engine, the roller bearing includes: a plurality of rollers; a retainer which is cirumferentially splittable and supports the rollers; and an inner race which is cirumferentially splittable and forms a raceway surface for the rollers; wherein the retainer is split into a plurality of retaining members; the inner race is split into a plurality of race plates; and at least one of the race plates is provided with one of a projection and a cavity to be engaged with the rotating shaft to restrict a relative movement between the one of the race plates and the rotating shaft.

The invention provides a roller bearing for rotatably supporting a rotating shaft of an internal combustion engine between a main body and a cap, including: a plurality of rollers; a retainer which is cirumferentially splittable and supports the rollers; and an outer race which is cirumferentially splittable and forms a raceway surface for the rollers; wherein the retainer is split into a plurality of split retaining members; the outer race is split into a plurality of split race plates; the race plates are disposed into concave portions of the main body and the cap; and the race plates in a free state have greater radii of curvature than radii of curvature of the concave portions.

The invention provides a method of manufacturing a race plate in a roller bearing for an internal combustion engine, wherein the roller bearing includes a plurality of rollers, a retainer which is cirumferentially splittable into a plurality of retaining members for supporting the rollers, and an outer race which is cirumferentially splittable into a plurality of race plates for forming a raceway surface for the rollers, the method including: stamping out a plate material such that at least one end thereof is formed in such a shape as to be complementary to an end of another plate material; surface pressing at least one end side of the stamped-out plate material; rolling the plate material; subjecting the plate material to heat treatment; and subjecting the plate material to barreling.

The invention provides a method of manufacturing a retainer in a roller bearing for an internal combustion engine, wherein the roller bearing includes a plurality of rollers, a retainer which is cirumferentially splittable into a plurality of retaining members for supporting the rollers, and an outer race which is cirumferentially splittable into a plurality of race plates for forming a raceway surface for the rollers, the method includes: stamping out a plate material such that the width of a column portion located closest to an end portion formed in the retainer is narrower than the width of other column portions; rolling the plate material; subjecting the plate material to heat treatment; and subjecting the plate material to at least one of copper plating and silver plating.

BRIEF DESCRIPTION OF THE DRAWINGS

The present invention may be more readily described with reference to the accompanying drawings:

FIG. 8 is a side elevational view illustrating a state in which a race in accordance with this embodiment is built in a cap or the like;

DETAILED DESCRIPTION OF THE PREFERRED EMBODIMENTS

Figure 1:
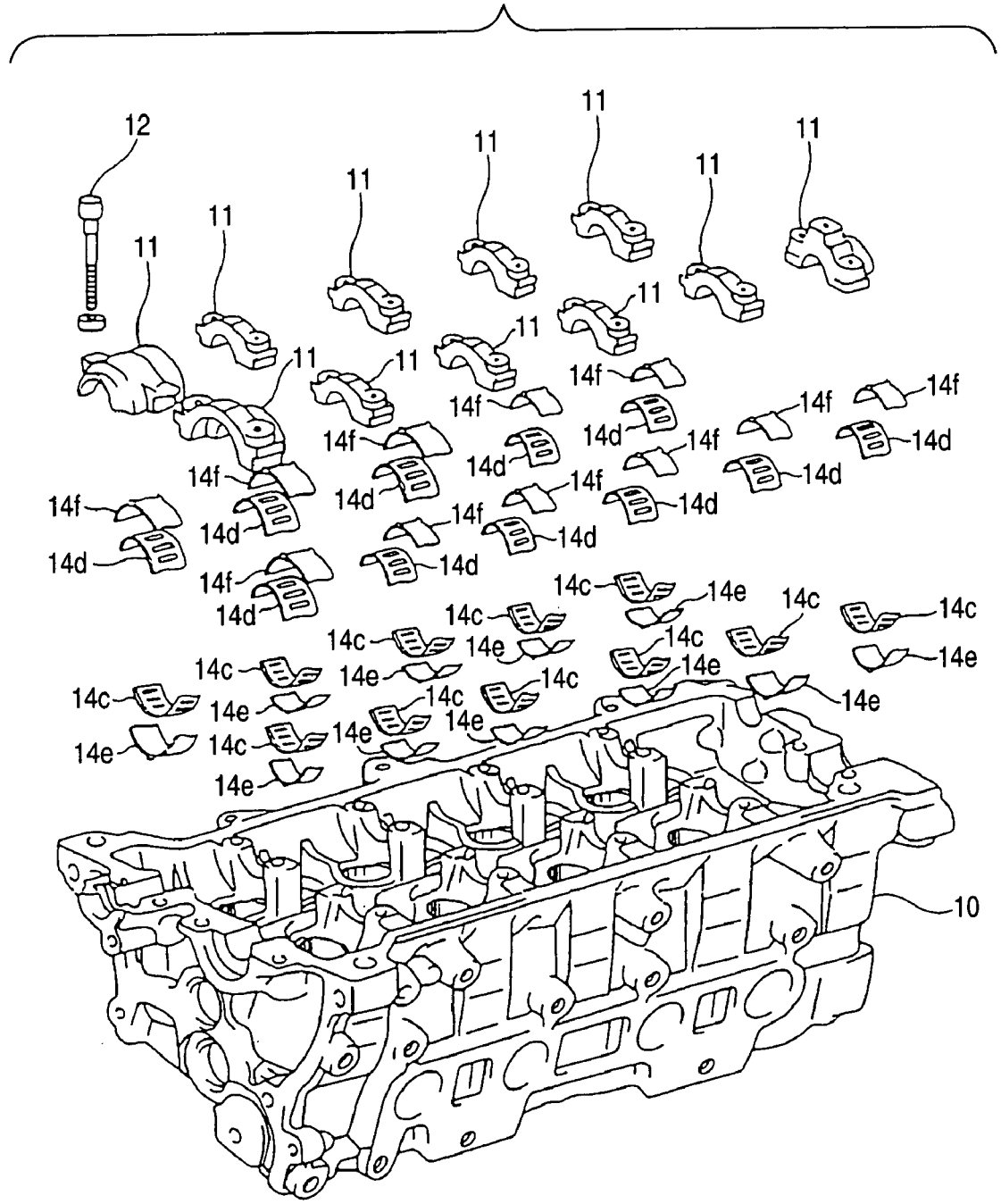
FIG. 1 is an exploded view of a cylinder head of an internal combustion engine in accordance with an embodiment of the invention.
Figure 2:
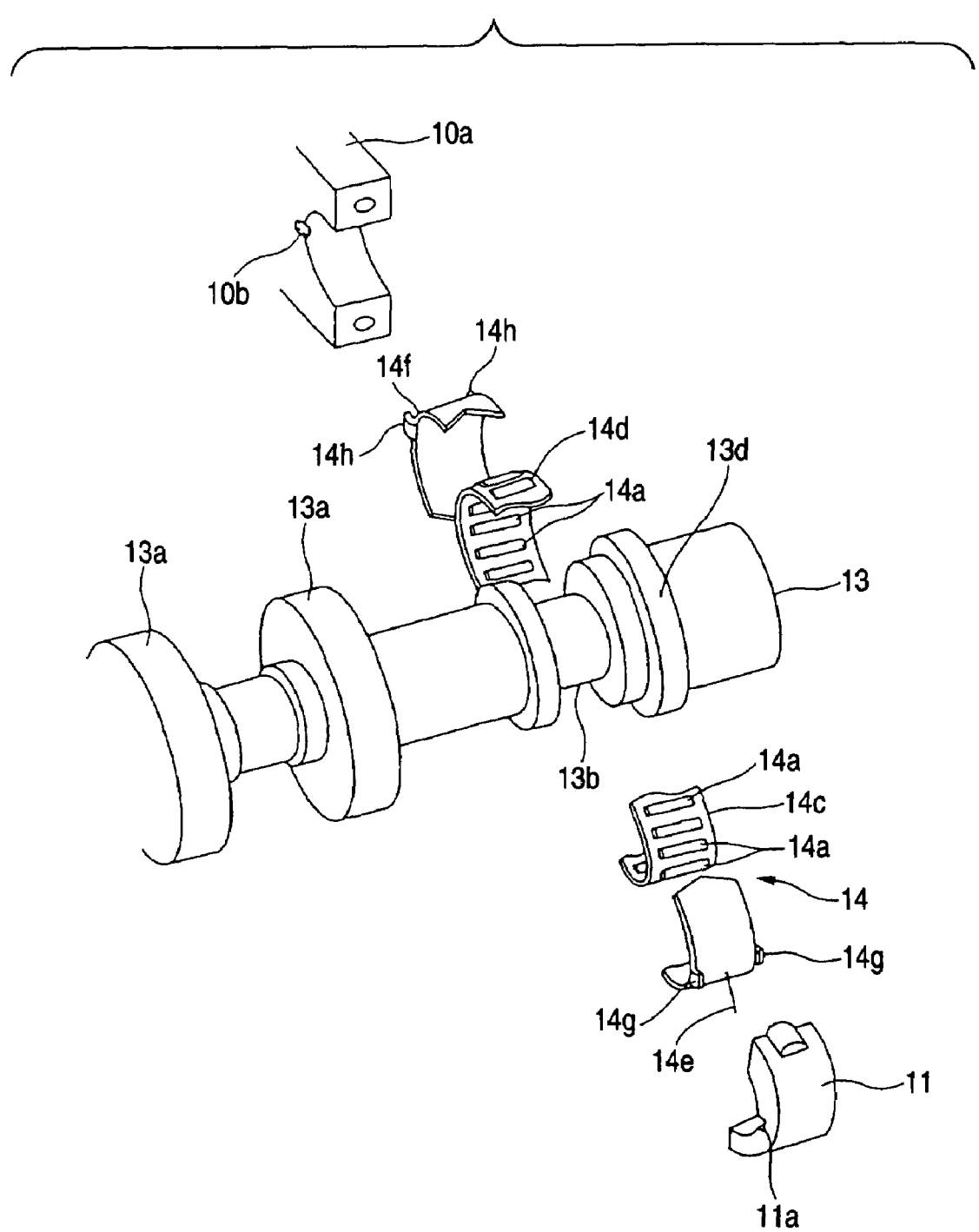
FIG. 2 is a partially enlarged view of a camshaft.

Hereafter, a detailed description will be given of an embodiment of the invention with reference to the drawings. FIG. 1 is an exploded view of a cylinder head of an internal combustion engine in accordance with this embodiment, but a camshaft is not shown. FIG. 2 is a partially enlarged view of the camshaft. In FIG. 1, the unillustrated camshaft is assembled to a cylinder head 10 as semiannular caps 11 are fitted on the camshaft and fastened to the cylinder head 10 by means of bolts 12 (only one bolt is shown).

In FIG. 2, a camshaft 13 has a pair of cam lobes 13a, a cylindrical journal portion 13b supported by a roller bearing 14, and a large-diameter end portion 13d. The outside diameter of the journal portion 13b is smaller than the largest dimension of each cam lobe 13a and the outside diameter of the large-diameter end portion 13d. The roller bearing 14 in this embodiment has a plurality of rollers 14a, circumferentially two-split substantially semicylindrical retaining members 14c and 14d, and circumferentially two-split substantially semicylindrical race plates 14e and 14f disposed between the cylinder head 10 and the caps 11. It should be noted that the retaining members 14c and 14d constitute a retainer, while the race plates 14e and 14f constitute an outer race, and inner peripheral surfaces of the race plates 14e and 14f constitute raceway surfaces for the rollers.

As shown in FIG. 2, circumferential both ends of the retaining member 14c have waveform shapes (combinations of recessed and projecting shapes) similar to sine curves, while circumferential both ends of the retaining member 14d opposing thereto have complementary waveform shapes (combinations of projecting and recessed shapes). Meanwhile, a circumferential end of the race plate 14e has a wedge shape, and the other end thereof has a V-shape. A circumferential end of the race plate 14f opposing thereto has a complementary V-shape, and the other end thereof has a complementary wedge shape.

Further, the race plate 14e on the cap 11 side has a pair of projections (formed by bending projecting pieces) 14g projecting radially outwardly from both sides of its central portion. Meanwhile, cavities 11a (only one is shown) corresponding to the projections 14g are formed in the cap 11. The arrangement provided is such that when the race plate 14e is assembled to the cap 11, its projections 14g respectively engage the cavities 11a, thereby preventing the circumferential movement and axial movement of the race plate 14e with respect to the cap 11.

The race plate 14f has a pair of projections (formed by bending projecting pieces) 14h projecting radially outwardly from both sides of its central portion. Meanwhile, cavities 10b (only one is shown) corresponding to the projections 14h are formed in a receiving portion 10a of the cylinder head. The arrangement provided is such that when the race plate 14f is assembled to the receiving portion 10a, its projections 14h respectively engage the cavities 10b, thereby preventing the circumferential movement and axial movement of the race plate 14f with respect to the receiving portion 10a.

According to this embodiment, since the cylindrical retainer is formed by combining the ends of the retaining members 14c and 14d, the movement of load between the retaining members 14c and 14d ceases to be abrupt by virtue of the combination of the waveform shapes of their ends during the operation of the roller bearing 14. In addition, since the waveform projecting shapes at their ends restrict the axial movement of the retaining members 14c and 14d, the operation of the roller bearing 14 can be effected smoothly.

Furthermore, since the cylindrical outer race is formed by combining the ends of the race plates 14e and 14f, the movement of load when the roller 14a crosses over between the race plates 14e and 14f ceases to be abrupt by virtue of the combination of the wedge shape and the V-shape at their ends during the operation of the roller bearing 14. In addition, since the axial movement of the race plates 14e and 14f is restricted, the operation of the roller bearing 14 can be effected smoothly.

Furthermore, as the race plates 14e and 14f are separately subjected to hardening treatment or the like, their hardness can be increased, and their wear resistance can be improved. Therefore, it becomes unnecessary to provide hardening treatment to supporting portions of the cylinder head 10, and it becomes possible to simplify the manufacturing process. For similar reasons, if an inner race which is split in the same way as the outer race is provided between the roller bearing 14 and the journal portion 13b of the camshaft 13, it becomes unnecessary to provide hardening treatment to the journal portion 13b of the camshaft 13, so that it is possible to simplify the manufacturing process.

It should be noted that ends of the retaining members 14c and 14d may be formed in a wedge shape and a V-shape, and the ends of the race plates 14e and 14f may be formed in waveform shapes, or may be formed in such straight end shapes as are not perpendicular to both side edges (the race plate, when developed into a plan, assumes the shape of a parallelogram). Namely, it suffices if the ends overlap each other in the axial direction when the opposing race plates are abutted against each other.

Figure 3:
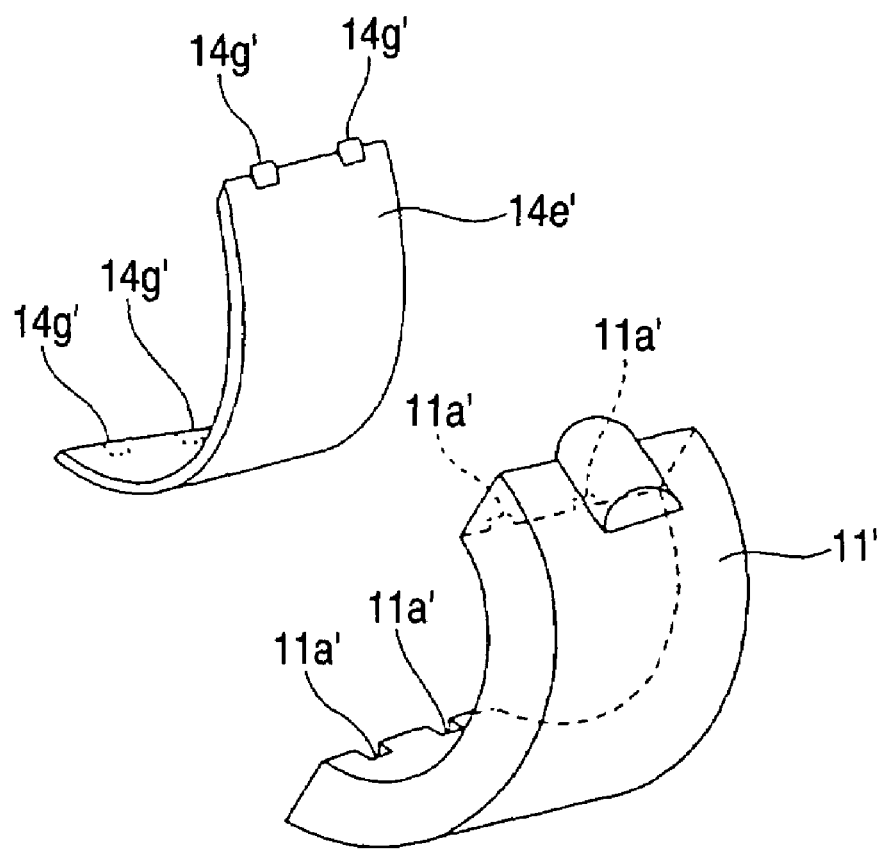
FIG. 3 is a perspective view of a race plate and a cap illustrating a modification of this embodiment.

FIG. 3 is a perspective view of the race plate and the cap illustrating a modification of this embodiment. In FIG. 3, a race plate 14e' has a shape in which its both ends are cut in a plane including the axis of the race. Two projections 14g' are formed at outer peripheries of the respective ends. On the other hand, cavities 11a corresponding to the projections 14g' are formed in a cylindrical inner peripheral surface of the cap 11'. The arrangement provided is such that when the race plate 14e' is assembled to the cap 11', its projections 14g' respectively engage the cavities 11a', thereby preventing the circumferential movement and axial movement of the race plate 14e' with respect to the cap 11'.

It should be noted that cavities may be provided in the race, and projections may be provided on the cap. A similar arrangement may be provided between the receiving portion of the cylinder head and the race plate fitted to the bottom.

Figure 4:
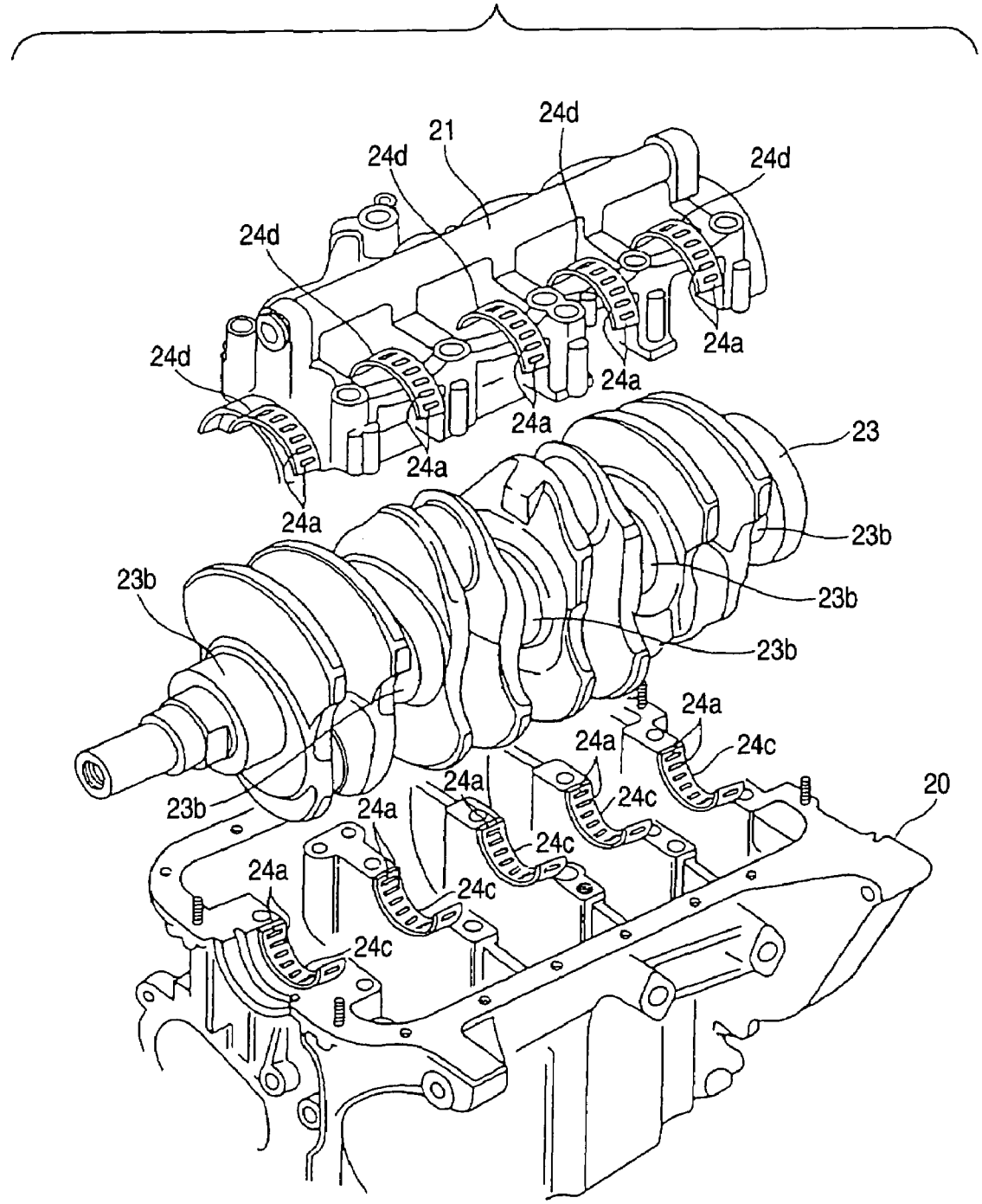
FIG. 4 is an exploded view of a cylinder block of an internal combustion engine in accordance with this embodiment.

FIG. 4 is an exploded view of the cylinder block of an internal combustion engine in accordance with this embodiment. In FIG. 4, a crankshaft 23 is assembled to a cylinder block 20 as a bearing cap (also called a cap) 21 is fitted on the crankshaft 23 and fastened to the cylinder block 20 by means of unillustrated bolts.

The crankshaft 23 has cylindrical journal portions 23b supported by roller bearings 24. The roller bearing 24 in this embodiment has a plurality of rollers 24a and circumferentially two-split retaining members 24c and 24d. It should be noted that the retaining members 24c and 24d constitute a retainer. Although not shown, race plates (races) such as those shown in FIGS. 1 and 2 are disposed between, on the one hand, the retaining members 24c and 24d and, on the other hand, the cylinder block 20 and the cap 21. In this embodiment as well, advantages similar to those of the above-described embodiment can be obtained.

Figure 5:
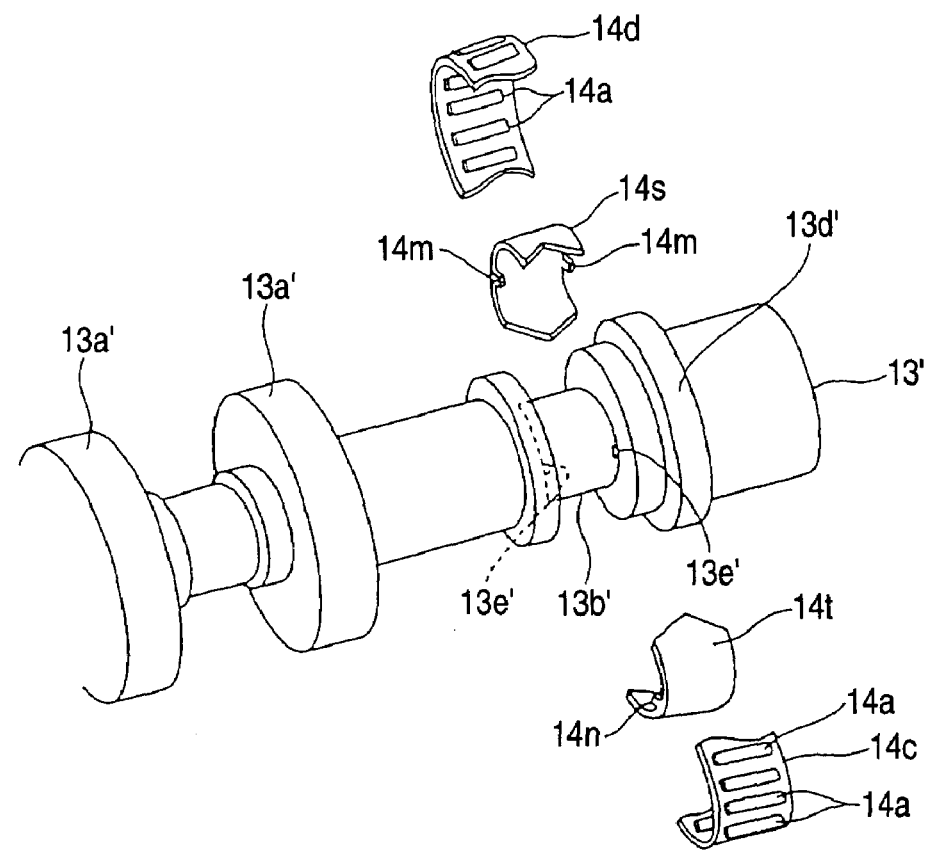
FIG. 5 is a partially enlarged view of the camshaft.

FIG. 5 is a partially enlarged view of the camshaft in accordance with a modification of this embodiment. A roller bearing 14' in accordance with this modification has the plurality of rollers 14a, the circumferentially two-split substantially semicylindrical retaining members 14c and 14d, and circumferentially two-split substantially semicylindrical race plates 14s and 14t disposed between, on the one hand, the retaining members 14c and 14d and, on the other hand, a camshaft 13'. It should be noted that the retaining members 14c and 14d having shapes similar to those of the embodiment shown in FIG. 2 constitute a retainer, while the race plates 14s and 14t constitute an inner race, and outer peripheral surfaces of the race plates 14s and 14t constitute raceway surfaces for the rollers.

In this modification as well, a circumferential end of the race plate 14s has a wedge shape, and the other end thereof has a V-shape. A circumferential end of the race plate 14t opposing thereto has a complementary V-shape, and the other end thereof has a complementary wedge shape.

Further, each of the race plates 14s and 14t has a pair of projections (formed by bending projecting pieces) 14m and 14n projecting radially inwardly from both sides of their central portions. Meanwhile, cavities 13e' corresponding to the projections 14m and 14n are formed in a journal portion 13b' of the camshaft 13'. The arrangement provided is such that when the race plates 14s and 14t are assembled to the camshaft 13', their projections 14m and 14n respectively engage the cavities 113e', thereby preventing the circumferential movement and axial movement of the race plates 14s and 14t with respect to the camshaft 13'.

Furthermore, since the cylindrical inner race is formed by combining the ends of the race plates 14s and 14t, the movement of load when the roller 14a crosses over between the race plates 14s and 14t ceases to be abrupt by virtue of the combination of the wedge shape and the V-shape at their ends during the operation of the roller bearing 14. In addition, since the axial movement of the race plates 14s and 14t is restricted, the operation of the roller bearing 14 can be effected smoothly.

Furthermore, as the race plates 14s and 14t are separately subjected to hardening treatment or the like, their hardness can be increased, and their wear resistance can be improved. Therefore, it becomes unnecessary to provide hardening treatment to the journal portion 13b' of the camshaft 13, and it becomes possible to simplify the manufacturing process. A similar inner race may be used jointly with the outer race shown in FIG. 2, and can similarly be mounted on a crankshaft as well.

Although a description has been given above of the embodiments of the invention, the invention should not be construed as being limited to the embodiments, and it goes without saying that various modifications and improvements can be made, as required. For example, the retainer may be circumferentially split into three or more parts.

In the roller bearing in accordance with the embodiments as described above, since one of a projection and a cavity for engaging one of the cylinder head and the cap to inhibit relative movement is formed on at least one of the race plates, if the projection or cavity corresponding to the cylinder head or the cap is formed in advance, the projection and the cavity are engaged. Therefore, it is possible to prevent the rotational movement or axial movement of the race plate with respect to the cylinder head or the cap. Furthermore, by the use of such a roller bearing, the drag torque is smaller than the sliding bearing conventionally in use, so that an advantage can be obtained in that the dynamic loss becomes small.

When at least one circumferential end of one of the race plates is formed in such a shape as to be complementary to a circumferential end of an opposing one of the race plates and to at least overlap each other in an axial direction, fluctuations in load become gentle when the roller rolls from one race plate to the other race plate. Hence, this arrangement is advantageous in the light of vibrations and noise. In addition, there is another advantage in that the mutual axial movement of the race plates is suppressed by virtue of such shapes of the ends.

When at least one circumferential end of one of the retaining members is formed in such a shape as to be complementary to a circumferential end of an opposing one of the retaining members and to at least overlap each other in an axial direction, fluctuations in load can be suppressed when the retaining members move together with the roller. Hence, this arrangement is advantageous in the light of vibrations and noise. In addition, there is another advantage in that the mutual axial movement of the retaining members is suppressed by virtue of such shapes of the ends.

In the roller bearing in accordance with the embodiments as described above, since one of a projection and a cavity for engaging camshaft to inhibit relative movement is formed on at least one of the race plates, if the projection or cavity corresponding to the camshaft is formed in advance, the projection and the cavity are engaged. Therefore, it is possible to prevent the rotational movement or axial movement of the race plate with respect to the camshaft. Furthermore, by the use of such a roller bearing, the drag torque is smaller than the sliding bearing conventionally in use, so that an advantage can be obtained in that the dynamic loss becomes small.

When at least one circumferential end of one of the race plates is formed in such a shape as to be complementary to a circumferential end of an opposing one of the race plates and to at least overlap each other in an axial direction, the arrangement is preferable for a similar reason.

When at least one circumferential end of one of the retaining members is formed in such a shape as to be complementary to and at least overlap in an axial direction with a circumferential end of an opposing one of the retaining members, the arrangement is preferable for a similar reason.

In the roller bearing in accordance with the embodiments as described above, since one of a projection and a cavity for engaging one of the cylinder block and the cap to inhibit relative movement is formed on at least one of the race plates, if the projection or cavity corresponding to the cylinder block or the cap is formed in advance, the projection and the cavity are engaged. Therefore, it is possible to prevent the rotational movement or axial movement of the race plate with respect to the cylinder block or the cap. Furthermore, by the use of such a roller bearing, the drag torque is smaller than the sliding bearing conventionally in use, so that an advantage can be obtained in that the dynamic loss becomes small.

When at least one circumferential end of one of the race plates is formed in such a shape as to be complementary to a circumferential end of an opposing one of the race plates and to at least overlap each other in an axial direction, fluctuations in load become gentle when the roller rolls from one race plate to the other race plate. Hence, this arrangement is advantageous in the light of vibrations and noise. In addition, there is another advantage in that the mutual axial movement of the race plates is suppressed by virtue of such shapes of the ends.

When at least one circumferential end of one of the retaining members is formed in such a shape as to be complementary to a circumferential end of an opposing one of the retaining members and to at least overlap each other in an axial direction, fluctuations in load can be suppressed when the retaining members move together with the roller. Hence, this arrangement is advantageous in the light of vibrations and noise. In addition, there is another advantage in that the mutual axial movement of the retaining members is suppressed by virtue of such shapes of the ends.

In the roller bearing in accordance with the embodiments as described above, since one of a projection and a cavity for engaging crankshaft to inhibit relative movement is formed on at least one of the race plates, if the projection or cavity corresponding to the crankshaft is formed in advance, the projection and the cavity are engaged. Therefore, it is possible to prevent the rotational movement or axial movement of the race plate with respect to the crankshaft. Furthermore, by the use of such a roller bearing, the drag torque is smaller than the sliding bearing conventionally in use, so that an advantage can be obtained in that the dynamic loss becomes small.

When at least one circumferential end of one of the race plates is formed in such a shape as to be complementary to a circumferential end of an opposing one of the race plates and to at least overlap each other in an axial direction, the arrangement is preferable for a similar reason.

When at least one circumferential end of one of the retaining members is formed in such a shape as to be complementary to and at least overlap in an axial direction with a circumferential end of an opposing one of the retaining members, the arrangement is preferable for a similar reason.

In addition, since the gap between the opposing ends of the retaining members 14c and 14d at the time of assembly is greater than 0 mm at a minimum reference temperature (e.g., −40° C.) (the gap being 0.1 to 2.5 mm at normal temperature), even when the internal combustion engine is cold started, the deformation of the retainers does not occur, and it is possible to ensure proper operation of the roller bearings 14.

In addition, since the gap between the opposing ends of the race plates 14e and 14f at the time of assembly is greater than 0 mm at a minimum reference temperature (e.g., −40° C.) (preferably, the gap being not less than 0.1 mm and not more than 1.0% of the outside diameter of the race), even when the internal combustion engine is cold started, the deformation of the races does not occur, and it is possible to ensure proper operation of the roller bearings 14.

Figure 6:
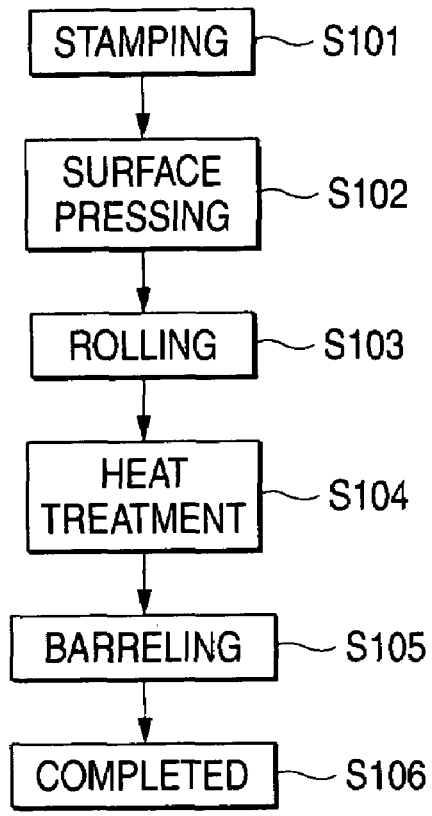
FIG. 6 is a flowchart illustrating a process for manufacturing the race plates in accordance with this embodiment.

FIG. 6 is a flowchart illustrating a process for manufacturing the race plates in accordance with this embodiment. The thickness of the plate material which is used as the material of the race plates is preferably 0.5 to 1.5 mm. The reason is that if the thickness is smaller than 0.5 mm, the race plates are liable to crack during heat treatment, whereas if the thickness exceeds 1.5 mm, their rigidity becomes excessively high, and the degree of close contact declines, possibly making it impossible to obtain satisfactory roundness.

Figure 7:
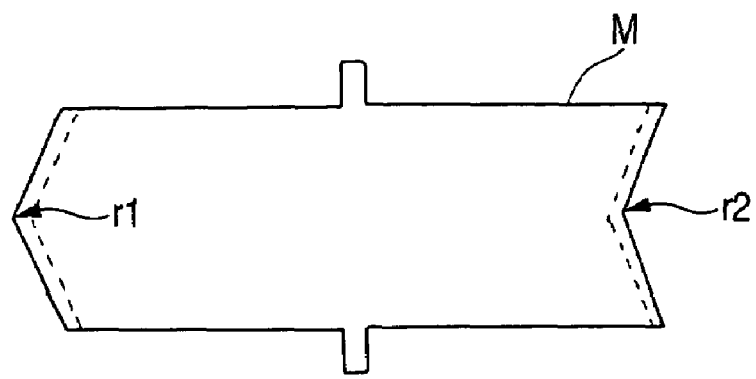
FIG. 7 is a diagram illustrating the shape a plate material M after its stamping for forming the race plate.

As shown in FIG. Step S101 in FIG. 6, such a plate material M is stamped out. The shape of such a plate material M is shown in FIG. 7. Subsequently, vicinities of both ends of the plate material M (positions indicated by dotted lines) are subjected to surface pressing. By virtue of surface pressing, burrs at the ends of the stamped plate material M are corrected, and since the shapes of the ends are corrected, the accuracy at the time of assembly improves. It should be noted that the radius of curvature r1 at the tip of the pointed end of the plate material M is greater than the radius of curvature r2 at the innermost portion of the opposite recessed end.

Figure 8:
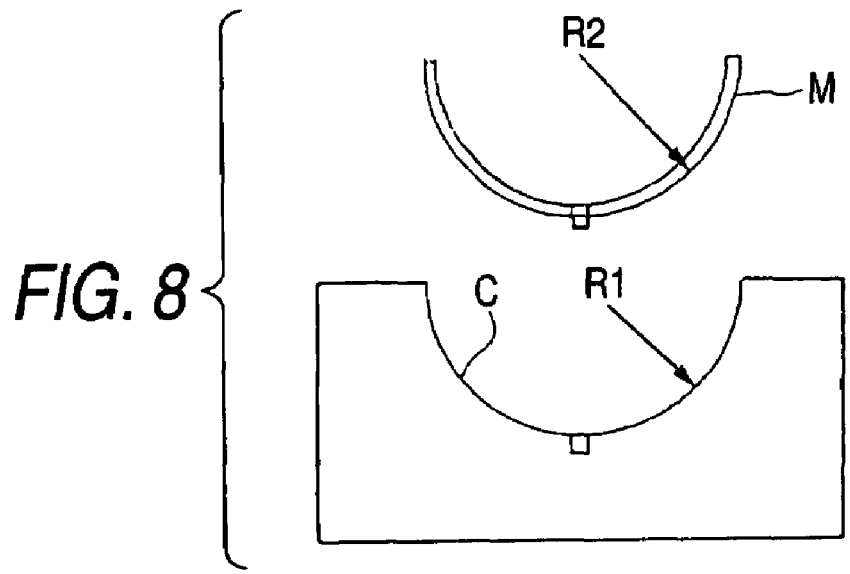

In Step S103, the plate material M is subjected to rolling. At this time, the plate material M is bent such that, in FIG. 8, the radius curvature R2 on the outer peripheral surface of the plate material M in a free state (i.e., the race plate) becomes slightly greater than the radius of curvature R1 of a concave portion C of the receiving portion or the cap. If such a shape is adopted, when the race plate is built in the concave portion of the receiving portion or the cap, by setting the roundness of the concave portion appropriately, the race plate is made to conform thereto, and the roller rolls along the truly round raceway surface. Therefore, it is possible to suppress unwanted vibrations and prolong the life of the roller bearing. It should be noted that if the plate material M is rolled such that the shear plane occurring at the time of stamping is located on the inner side (raceway surface side), it is possible to avoid effects such as burrs occurring at the fractured surface.

In Step S104 in FIG. 6, the rolled plate material M is subjected to heat treatment including quenching and tempering. In Step S105, the plate material M is subjected to barreling to remove burrs and the like, thereby completing the race plate.

Figure 9:
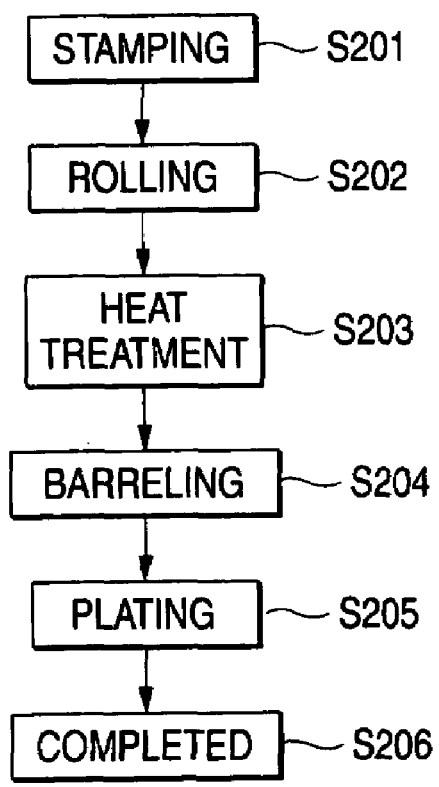
FIG. 9 is a flowchart illustrating the process of manufacturing a retaining member in accordance with this embodiment.
Figure 10:
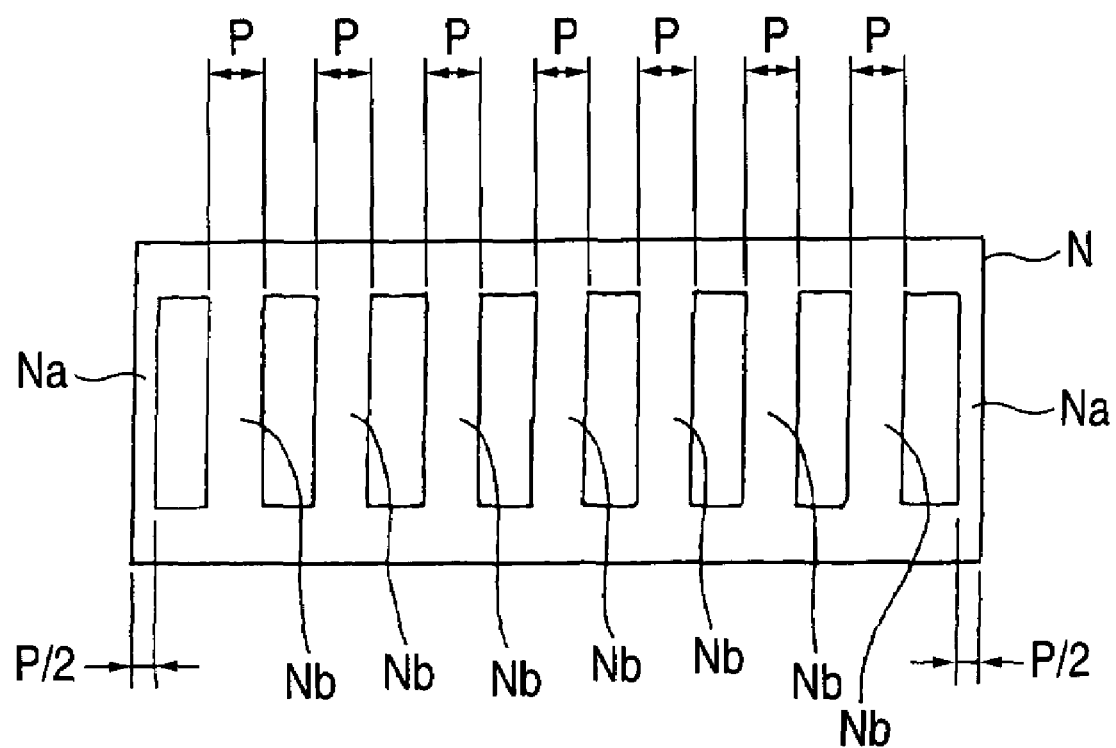
FIG. 10 is a diagram illustrating the shape of a plate material N after its stamping for forming the retaining member.

FIG. 9 is a flowchart illustrating the process of manufacturing the retainer in accordance with this embodiment. As shown in Step S201 in FIG. 9, such a plate material N is stamped out. The shape of such a plate material N is shown in FIG. 10. At this time, column portions Na and Nb are produced as pockets are formed by being punched out in the plate material N. Here, the width (P/2) of the column portion Na at each end is half the width (P) of each of the other column portions Nb. Accordingly, in a case where a retainer is formed by combining a pair of retaining members formed from such plate materials N, intervals between rollers retained in the pockets can be set to be equal intervals irrespective of places. It should be noted that the width of the column portion Na at each end is not limited to half the width of each of the other column portions Nb, and is sufficient if it is smaller than the same.

Furthermore, in Step S202 in FIG. 9, the plate material N is subjected to rolling. In Step S203, the rolled plate material N is subjected to heat treatment including quenching and tempering, and is subjected to barreling to remove burrs and the like in Step S204. In Step S205, the plate material N is subjected to copper plating or copper plus silver plating, thereby completing the retainer.

Figure 11:
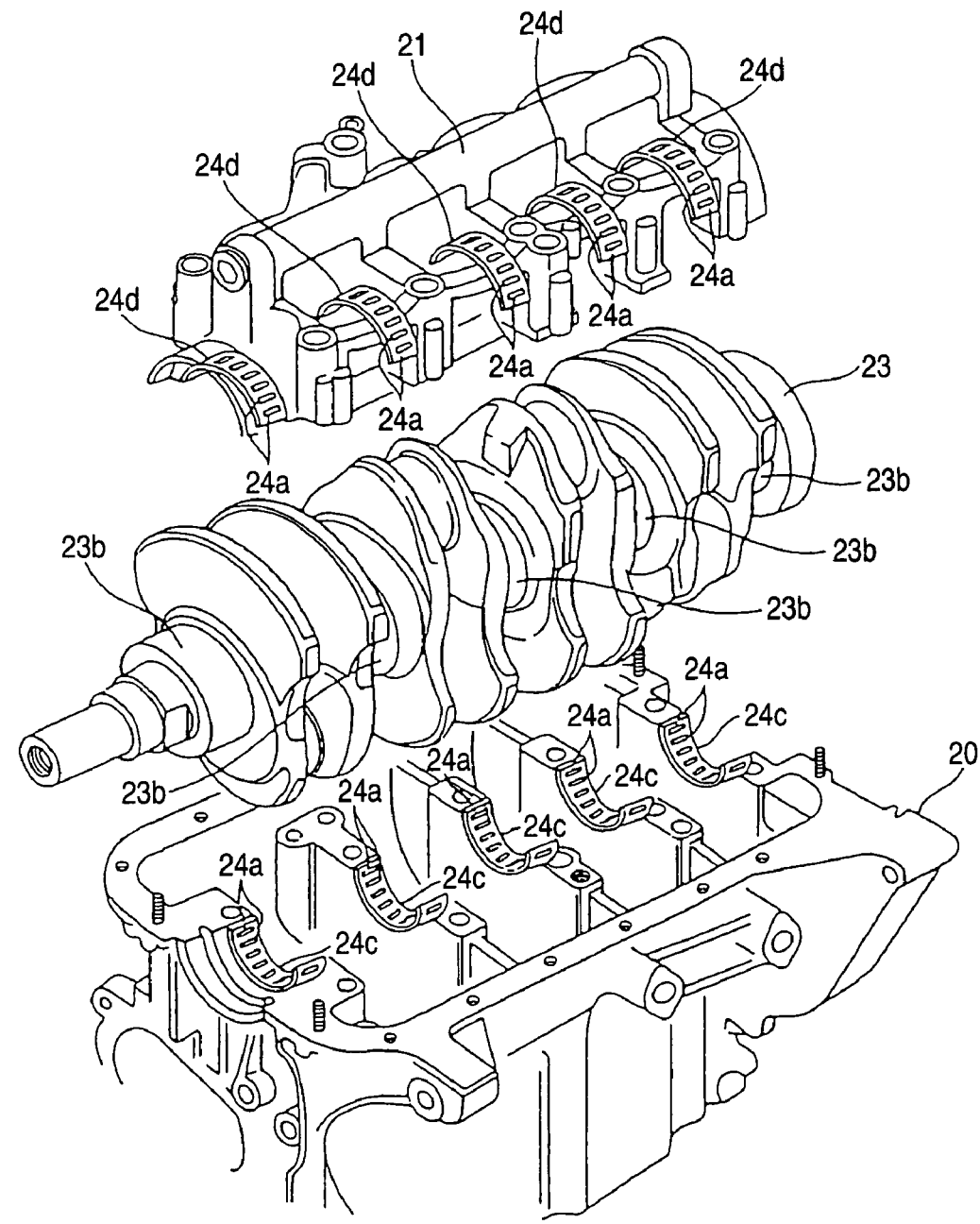
FIG. 11 is an exploded view of an engine block of an internal combustion engine in accordance with this embodiment.

FIG. 11 is an exploded view of an engine block of an internal combustion engine in accordance with this embodiment. In FIG. 11, the bearing cap (also called the cap) 21 is fastened to the engine block 20 by means of unillustrated bolts to form cylindrical surfaces. The crankshaft 23 is assembled to the engine block 20 by means of the bearings 24 which are disposed on the inner sides of the cylindrical surfaces.

The crankshaft 23 has the cylindrical journal portions 23b supported by the roller bearings 24. Each of the roller bearings 24 has the plurality of rollers 24a and the circumferentially two-split retaining members 24c and 24d. It should be noted that the retaining members 24c and 24d constitute the retainer. Although not shown, race plates (race) such as those shown in FIGS. 1 and 2 are disposed between, on the one hand, the retaining members 24c and 24d and, on the other hand, the engine block 20 and the cap 21. In this embodiment as well, advantages similar to those of the above-described embodiments are obtained.

Figure 12A:
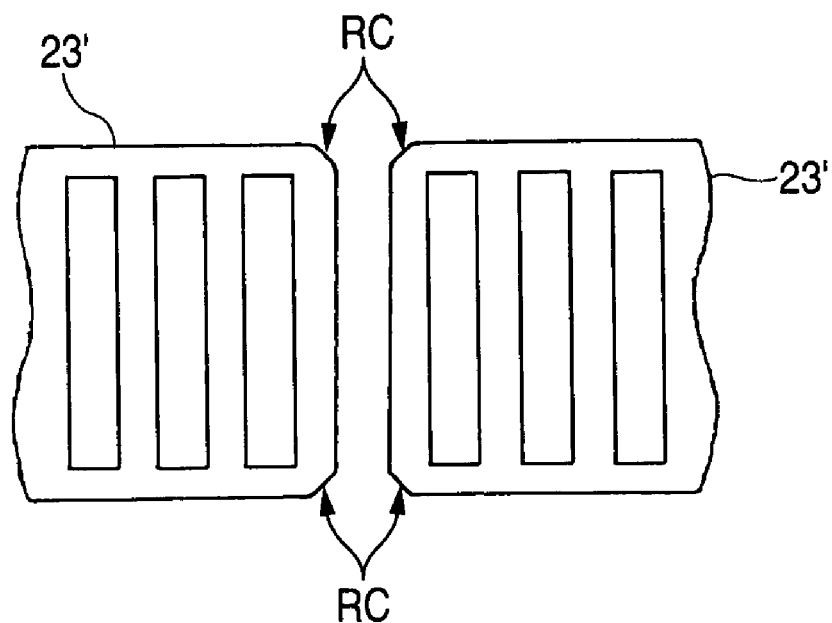
FIG. 12A is a view illustrating a state in which ends of retaining members in accordance with another embodiment are abutted against each other, and is a view taken from a radial direction.
Figure 12B:
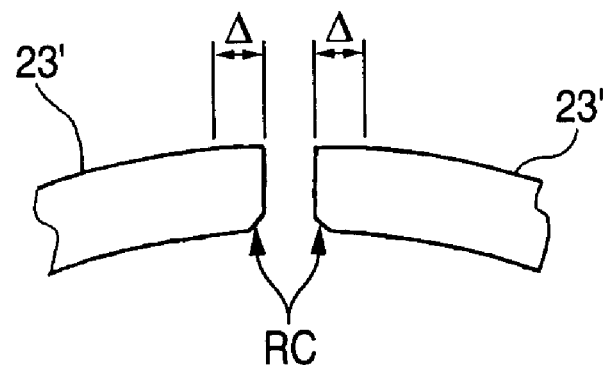
FIG. 12B is a view illustrating a state in which the ends of the retaining members are abutted against each other, and is a view taken from an axial direction.

FIG. 12A is a view illustrating a state in which ends of retaining members 23' in accordance with another embodiment are abutted against each other, and is a view taken from a radial direction. FIG. 12B is a view illustrating a state in which the ends of the retaining members 23' are abutted against each other, and is a view taken from an axial direction. As shown in FIG. 12A, chamfered portions RC of an arbitrary angle or radius of curvature are formed at corners of the ends of the retaining members 23' as viewed in the radial direction.

Furthermore, as shown in FIG. 12B, the chamfered portions RC of the arbitrary angle or radius of curvature are also formed at inner corners of the ends of the retaining members 23' as viewed in the axial direction. It should be noted that although outer peripheral surfaces at the ends of the retaining members 23' should essentially form portions of the cylindrical surface by rolling, it suffices if the outer peripheral surfaces at the ends of the retaining members 23' are subjected to cutting or surface pressing so that flat surfaces will be formed over a distance Δ (e.g., 1 mm) from the respective ends.

Figure 13:
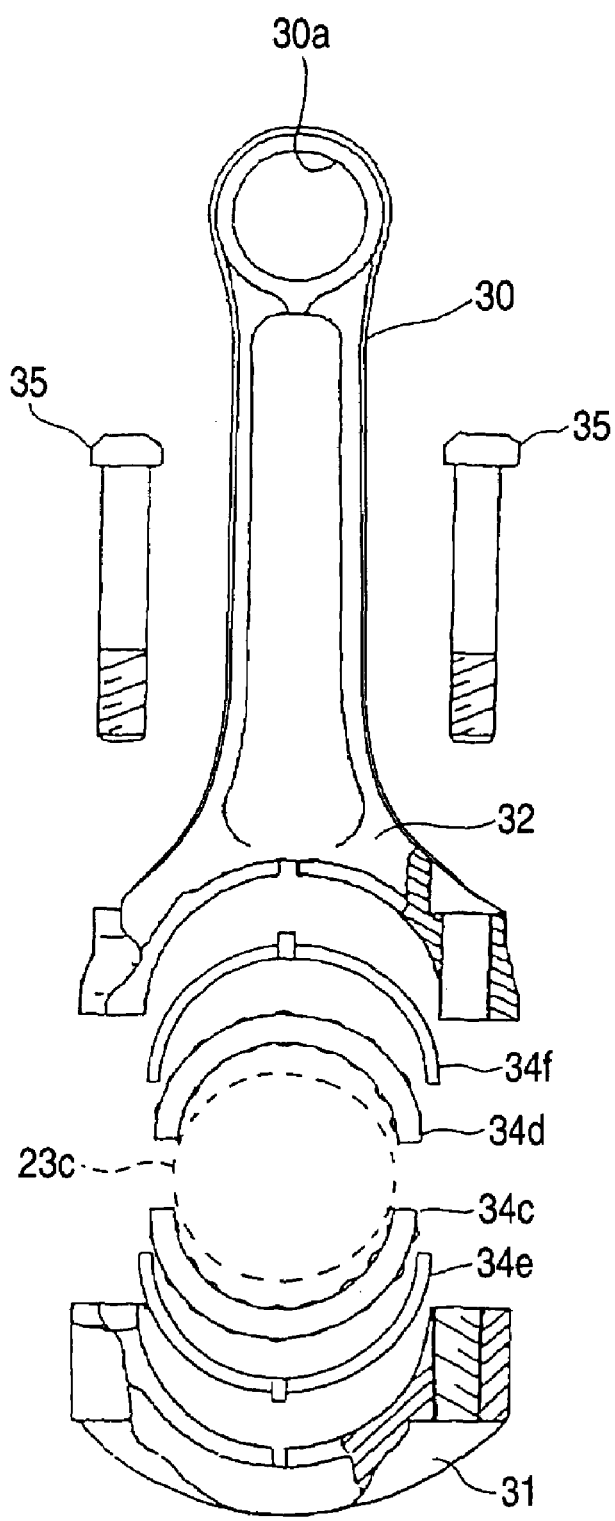
FIG. 13 is a diagram illustrating a connecting rod to which roller bearings in accordance with still another embodiment are applied.

FIG. 13 is a diagram illustrating a connecting rod to which the roller bearings in accordance with still another embodiment are applied. In FIG. 13, a connecting rod 30 is splittable, and is comprised of a cap 31 and a main body 32. A race member 34f similar to that of the above-described embodiments is fitted in the concave portion of the main body 32, and a similar race member 34e is also fitted in the concave portion of the cap 31.

At the time of assembly, the cap 31 and the main body 32 are made to approach a pin portion 23c of the crankshaft from both sides thereof with the interposition of retaining members 34c and 34d having shapes similar to the above-described ones and adapted to retain the rollers, and are fastened to each other by means of two bolts 35. The connecting rod 30 is thereby integrally fitted to the crankshaft. It should be noted that a bush 30a is disposed at a small end portion of the connecting rod 30 to hold an unillustrated piston pin relatively rotatably.

In the roller bearing in accordance with the embodiments as described above, the race plates are built on concave portions of the main body and the cap, and the race plates in a free state have greater radii of curvature than radii of curvature of the concave portions. Therefore, even if the accuracy of the race plates in a free state is slightly poor, by building the race plates are built on the concave portions, the race plates are deformed in such a manner as to conform to the roundness of the concave portions. Hence, it is possible to ensure that the roller rolls appropriately on the raceway surface which became close to the roundness in the state in which the race plates are incorporated.

Each of the retaining members is preferably provided with at least one of copper plating and silver plating, since lubricity improves.

The method of manufacturing a race plate in accordance with the embodiment as described above includes the steps of: stamping out a plate material such that the width of a column portion located closest to an end portion formed in the retainer is narrower than the width of other column portions; rolling the plate material; subjecting the plate material to heat treatment; and subjecting the plate material to at least one of copper plating and silver plating. Therefore, when the retainer is formed by combining the retaining members, the interval between the rollers which are retained at a position closest to the abutted ends of the retaining portions can be brought close to intervals between the other rollers. Therefore, it is possible to suppress fluctuations in the load during the operation of the roller bearing.

What is claimed is:

1. A roller bearing in combination with an internal combustion engine, wherein the roller bearing is disposed between a main body and a cap of the engine and rotatably supports a rotating shaft of the engine, the roller bearing comprising:
    a plurality of rollers;
    a retainer which supports the rollers; and
    an outer race which is circumferentially splittable and forms a raceway surface for the rollers,
    wherein the outer race is split into a plurality of split race plates;
    the race plates are disposed into concave portions of the main body and the cap of the internal combustion engine;
    the race plates in a free state have greater radii of curvature than radii of curvature of the concave portions.

2. The roller bearing and engine according to claim 1, wherein thickness of each of the race plates is formed to be 0.5 to 1.5 mm.

3. The roller bearing and engine according to claim 1,
    wherein the main body and the cap form a cylindrical surface to receive the plurality of race plates; and
    when the plurality of race plates are provided on the cylindrical surface, a gap between adjacent ends of the race plates is formed to be not less than 0.1 mm and not more than 1.0% of an outside diameter of the outer race at a minimum reference temperature.

4. The roller bearing and engine according to claim 1,
    wherein the main body and the cap form a cylindrical surface to receive the plurality of retaining members; and when the plurality of retaining members are provided on the cylindrical surface, a gap between adjacent ends of the retaining members is formed to be 0.1 to 2.5 mm at normal temperature.

5. The roller bearing and engine according to claim 1, wherein each of the retaining members is provided with at least one of copper plating and silver plating.

6. The roller bearing and engine according to claim 1, wherein a circumferential end of each of the race plates is provided with a surface pressed portion.

7. The roller bearing and engine according to claim 1, wherein the rotating shaft is a camshaft; and the main body is a cylinder head.

8. The roller bearing and engine according to claim 1, wherein the rotating shaft is a crankshaft; and the main body is an engine block.

9. The roller bearing and engine according to claim 1, wherein the rotating shaft is a crankshaft; and the main body is a connecting rod.

* * * * *